C. VON LINDE.
APPARATUS FOR ASCERTAINING THE COMPOSITION OF ANY BOILING MIXTURE OF LIQUIDS.
APPLICATION FILED FEB. 18, 1908.

999,574.  Patented Aug. 1, 1911.

WITNESSES:
H. M. Avery
J. P. Davis

INVENTOR
Carl von Linde
BY Munn & Co
ATTORNEYS

UNITED STATES PATENT OFFICE.

CARL von LINDE, OF MUNICH, GERMANY, ASSIGNOR TO LINDE AIR PRODUCTS COMPANY, OF CLEVELAND, OHIO.

APPARATUS FOR ASCERTAINING THE COMPOSITION OF ANY BOILING MIXTURE OF LIQUIDS.

999,574.  Specification of Letters Patent.  Patented Aug. 1, 1911.

Application filed February 18, 1908. Serial No. 416,463.

*To all whom it may concern:*

Be it known that I, CARL VON LINDE, professor, of the city of Munich, Kingdom of Bavaria, German Empire, have invented a certain new and useful Apparatus for Ascertaining the Composition of Any Boiling Mixture of Liquids, of which the following is a specification.

This invention has reference to an apparatus for ascertaining and for recording, whenever possible, the composition of boiling mixtures of liquid in each particular case.

The invention is based upon the fact, that at a given pressure (at the pressure of the atmosphere for instance) a certain saturating temperature corresponds to every composition of a boiling mixture of liquids, and inversely a certain definite saturating pressure corresponds to a given temperature. When a vessel in which a certain quantity of the mixture of liquids of known composition is contained, is placed into the same mixture of liquids in the boiling state, the temperature of the mixtures of liquids in the normal condition of inertia will be the same within and without the vessel, so that there will be equal saturating pressures only in case the composition of the mixture is the same within and without the vessel. For every other composition however, there will exist a certain difference between the saturating pressures which may serve as a means for measuring the composition of the liquid, boiling at the outside of the vessel in each case. Hence, it will be possible (1) to read off on a suitably located pressure gage the composition of the boiling liquid in every moment, (2) to cause the recording of changes in the composition of the boiling mixture of liquids by a recording pressure gage; (3) to indicate the point of exceeding certain limits of the difference of pressures, or of the compositions by alarm signals.

Figure 1:
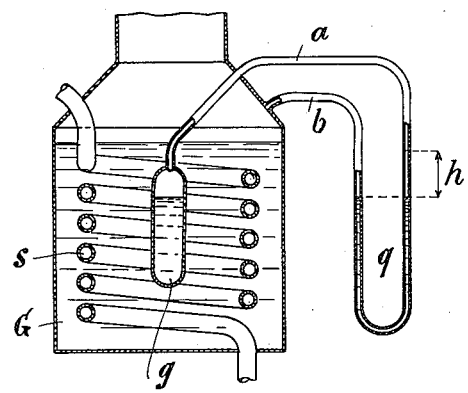
Figure 2:
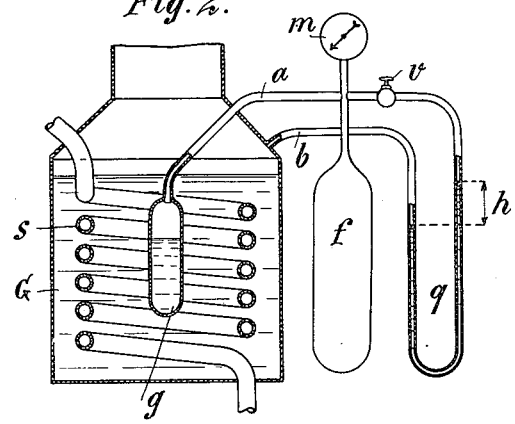

In the accompanying drawings Figure 1 is a diagrammatical view of the apparatus and Fig. 2 a similar view of the same apparatus provided with a particular armature.

The boiler G contains the boiling mixture of liquids into which the heat for evaporation may be introduced for instance by way of the coil $s$. The vessel $g$ contains a certain amount of the same mixture of liquids of known invariable composition. By means of the conduit $a$, the pressure prevailing in $g$ is transmitted to the pressure gage $q$ which is connected to the boiler G at the point $b$, so that the difference of levels $h$ indicates the difference of pressures of the two liquids at the boiling temperature $t$ at the time being. Now, to each value of $h$ corresponds a certain composition of the boiling liquid mixture, and from the physical constants of the particular liquid mixture a scale may be computed which may be attached to the pressure gage, and which thereby allows the direct reading off of the composition; at least in case the mixture consists of two different liquids only. When the evaporation takes place under atmospheric pressure, the connecting part $b$ may be dispensed with.

In the case of a mixture of liquids which at the ordinary temperature can only exist in the gaseous state, such for instance as atmospheric air, it will be of advantage, to include in the conduit a vessel $f$ with pressure gage $m$ and shutting valve $v$ in accordance with Fig. 2, this vessel being able to take up at the ordinary temperature such a quantity of gas mixture of known composition without going beyond the allowable pressure, as is required for the filling of the vessel $g$ with the necessary amount of liquid. When the apparatus is not in operation and at the ordinary temperature, this amount of gas mixture will be found to be evenly distributed in the system of apparatus formed by the vessels $f$ and $g$, the pressure gage $m$ and the pipe $a$ up to the closed valve $v$. When the apparatus is operated and the vessel G is filled with liquid, the gas mixture contained in the system, will be liquefied in the vessel $g$, the valve $v$ may be opened and the pressure gage $q$ will then indicate directly the difference of pressure, corresponding to the composition of the liquid in the vessel G. When the operation of the apparatus is interrupted, the valve $v$ is closed. Now when the liquid disappears in the vessel G, and the apparatus becomes heated up, the liquid evaporates in the vessel $g$ and the gas mixture becomes distributed again uniformly in the entire above-mentioned system at a pressure, indicated by the pressure gage $m$. Thus, one and the same quantity of the gas mixture of known composition may be utilized during as many operation periods of the apparatus, as ever desired.

What I claim and desire to secure by Letters Patent of the United States, is:—

1. Apparatus for ascertaining the combination of any boiling mixture of fluids, comprising a boiler to contain the fluid to be tested, a vessel within said boiler in position to be immersed in said fluid and for containing a fluid mixture of known composition, a pressure gage having a movable element and located wholly exteriorly of said boiler and said vessel, and connected at one side of its movable element with the said vessel, and said gage having the other side of its movable element subjected to a different pressure, whereby said movable element acts differentially in regard to the two pressures.

2. Apparatus for ascertaining the composition of any boiling mixture of fluids, comprising a boiler to contain fluid to be tested, means for heating said fluid, a vessel located within said boiler so as to be immersed in said fluid and for containing a fluid mixture of known composition, a U-shaped pressure gage located wholly exteriorly of the boiler and vessel and having a liquid movable member, one arm of said gage communicating with the boiler and the other member of said gage communicating with the vessel in said boiler.

3. In an apparatus of the character described, the combination of two containers, one disposed within and separated from the wall of the other, a gage, a valved pipe connecting said gage with the inner container, a second gage communicating with said pipe between the valve therein and the inner container, and a pipe connecting said first-mentioned gage with the outer container.

4. Apparatus for ascertaining the composition of any particular mixture of boiling liquids, which consists of an outer container for a boiling mixture of liquids, an inner container having therein the same mixture of liquids of known composition, and arranged in the liquid of the outer container, a pressure gage for indicating the difference in the two pressures, said gage located exteriorly of the said containers and connected on the one hand to the inner container and on the other hand to the space above the liquid of the outer container, so as to be under the pressure of the liquid boiling mixture without being subjected to direct heat from the liquids within said containers.

5. Apparatus for ascertaining the composition of any particular mixture of liquids, which consists of an outer boiling liquid containing vessel, an inner container (g) a pressure gage intermediate between said containers, and an additional vessel (f) and a pressure gage (m), connected to the latter vessel, and a valve (v) between said pressure gages, for the purpose of utilizing the process for mixture of liquids which can only exist in the gaseous state at the ordinary temperature.

In witness whereof I have hereunto signed my name in the presence of two subscribing witnesses.

CARL von LINDE.

Witnesses:
 ABRAHAM SCHLESINGER,
 LOUIS F. MUELLER.